United States Patent [19]
Rausch et al.

[11] 3,994,806
[45] Nov. 30, 1976

[54] COMPOSITION AND METHOD FOR FLOCCULATING SUSPENDED SOLIDS

[75] Inventors: Emerson George Rausch; Ramon Anthony Muia, both of Coraopolis, Pa.

[73] Assignee: Calgon Corporation, Pittsburgh, Pa.

[22] Filed: Mar. 8, 1972

[21] Appl. No.: 232,922

[52] U.S. Cl. .................................. 210/52; 210/54; 252/325
[51] Int. Cl.² ...................................... B01D 21/01
[58] Field of Search ........................ 210/52–54; 252/325

[56] References Cited
UNITED STATES PATENTS

| | | | |
|---|---|---|---|
| 3,055,827 | 9/1962 | Wiley | 210/53 |
| 3,165,465 | 1/1965 | Ray et al. | 210/54 X |
| 3,484,837 | 12/1969 | Odom et al. | 210/54 X |
| 3,509,021 | 4/1970 | Woodward | 210/54 X |
| 3,545,941 | 12/1970 | Wilson | 210/53 X |

FOREIGN PATENTS OR APPLICATIONS 589,309  12/1959  Canada ................................ 210/54

*Primary Examiner*—Charles N. Hart
*Assistant Examiner*—Peter A. Hruskoci
*Attorney, Agent, or Firm*—Rudolph J. Anderson, Jr.; Harry E. Westlake, Jr.; Martin L. Katz

[57] ABSTRACT

In the flocculation and removal of suspended matter from water, combinations of cationic and nonionic water-soluble polymers are found to be more effective than equivalent concentrations of cationics alone, and significantly lower concentrations of the combination are found to be equivalent in effect to higher concentrations of cationic polymers alone.

2 Claims, No Drawings

COMPOSITION AND METHOD FOR FLOCCULATING SUSPENDED SOLIDS

BACKGROUND OF THE INVENTION

It has been known for some time that cationic water-soluble polymers can flocculate and remove suspended finely divided solids from water. This can be seen for example, in Weidner et al U.S. Pat. No. 2,995,512, and Wiley U.S. Pat. No. 3,055,827. Such cationic polymers made from the monomer dimethyl diallyl ammonium chloride are shown in Schuller et al U.S. Pat. No. 2,923,701, and in Butler's Canadian Pat. No. 945,432. See, also, Hoover et al U.S. Pat. No. 3,412,019 and Schaper U.S. Pat. No. 3,514,398.

Virtually all water intended to be used for drinking, as in a municipal water supply, is subjected to a clarification process to remove substances which impart turbidity and objectionable color to the water. In addition, most natural waters used for industrial purposes are subjected to a clarification process. These substances are generally nonsettling clay, bacteria, and colloidal silt-like materials. The nonsettling particles usually have a particle diameter of less than 10 microns, most often between 1.0 and 0.01 microns. Because of the small particle size, these materials cannot be removed by simple settling processes. The colloidal particles of the smaller size present the major problem because they are present to some extent at all times, and during certain periods are present in very high concentrations, as for example, during periods of climatic disturbances such as heavy rain and snow storms, high winds, and the like.

For all practical purposes, particles having a diameter of less than 10 microns cannot be removed by untreated settling alone. The smaller particles settle so slowly on their own that the retention time is excessive and makes the treatment economically unattractive. Therefore, coagulation has been used to remove these small diameter particles from natural waters. In coagulation, the fine particles are joined together to form larger and heavier particles (flocs) which are able to settle rapidly. In this way, water is obtained which is of sufficient clarity and purity to be acceptable for most industrial purposes and which only needs to be filtered and chlorinated to be of a potable quality. The flocculation process makes it possible to remove the fine particles which would not be removed by settling and which would pass through the filter medium (which must be somewhat coarse to permit acceptable flow rates). With waters of low turbidity, that is, having a Jackson Turbidity Unit value from 1.0 to 10.0, flocculation may be followed by filtration. However, for waters having higher turbidities, a settling step is necessary before filtration.

The most widely used coagulants in the past were aluminum or iron. Aluminum sulfate (filter alum) was the most widely used coagulant. Ferrous sulfate (copperas) was also used to a great extent. Ferric sulfate (ferrifloc of ferrisul), ferric chloride, and sodium aluminate have also been employed to some extent as coagulants. The chemical reactions which occur during coagulation with these inorganic coagulants are somewhat complex and involve not only the direct union of the coagulant ions with the impurities in the water, but they also involve the formation of hydrous oxides. The hydrous oxides of the metals are the flocs which ultimately precipitate and remove the objectionable contaminants from the water.

In addition, certain highly colloidal clays of the swelling bentonite type have been used for clarification. These clays are produced generally in Wyoming and South Dakota and are capable of forming thick gels many times the volume of the original bentonite when added to water. They are sometimes called "sodium bentonites" and their use for water purification purposes is fully described in U.S. Pat. No. 2,345,827 and 2,362,022.

Because of their availability and ease of use, the above-mentioned inorganic coagulants have been widely used. However, these inorganic coagulants do not form a very stable floc and, in addition, the flocs are not as large as is desirable for rapid settling. Therefore, it has become common to use a polyelectrolyte in conjunction with the inorganic coagulant or as a partial or total replacement for the inorganic coagulant. For example, Hronas, in U.S. Pat. No. 3,066,095, discloses the use of the inorganic coagulants along with a bentonitic clay and a polyacrylamide. See, also, Hedrick et al U.S. Pat. Nos. 3,516,932 and 3,637,491. In addition, see Wiley, U.S. Pat. No. 3,055,827, which discloses the use of a vinyl benzyl quaternary ammonium polymer. Other patents of interest in this area are Nagan, U.S. Pat. No. 3,131,144; Demeter, U.S. Pat. No. 3,350,302; Clark, U.S. Pat. No. 3,388,060; and Dajani, U.S. Pat. Nos. 3,408,292 and 3,409,547.

For certain purposes it is also known to combine the use of a cationic polymer with the use of an anionic polymer but without premixing them. See Priesing et al U.S. Pat. No. 3,259,570.

Sak, in U.S. Pat. No. 3,397,139, suggests the addition of both a cationic polymer and an anionic polymer at different points in a sludge treatment method.

To our knowledge, however, it has not been suggested to use a combination of cationic polymers such as homopolymers of polyethylene imine and/or dimethyl diallyl ammonium chloride and/or methacryloxyethyl trimethyl ammonium methosulfate combined with nonionic polyacrylamide and/or polyethylene oxide.

In particular, no one to our knowledge has discovered the increase in efficiency which may be imparted to the use of such cationics by the co-mixture therewith of from about 5 weight percent to about 20 weight percent of a nonionic polymer.

SUMMARY OF THE INVENTION

We have discovered that the efficiency of cationic flocculants can be greatly improved by the addition of small amounts of nonionic polymer thereto.

The cationic polymers useful in our invention are high molecular weight, water-soluble, cationic polymers. These polymers are prepared by utilizing any of the well known cationic monomers that readily undergo free radical polymerization. In addition, some of the useful cationic polymers are prepared by condensation polymerization as is realized by one skilled in the art.

A particularly useful and preferred group of cationic polymers which may be employed in our invention are the high molecular weight, water-soluble polymers of the dialkyl diallyl quaternary ammonium chlorides. They are represented by the formula

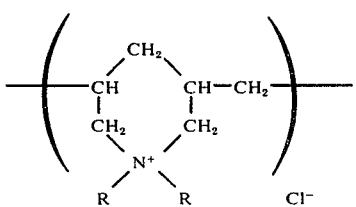

where "R" is hydrogen or an alkyl group of 1 to 18 carbon atoms. The preparation and use of this class of compounds is illustrated in Butler U.S. Pat. No. 3,288,770, Boothe U.S. Pat. Nos. 3,461,163 and 3,472,740, Schuller et al U.S. Pat. No. 2,923,701 and Booth et al U.S. Pat. No. 3,147,218. The preferred dialkyl diallyl polymers are when "R" is a lower alkyl group of 1 to 4 carbon atoms, preferably methyl.

Another useful class of cationic polymers are the acryloxyalkyl quaternary ammonium compounds. The polymeric form of these compounds is represented by the formula

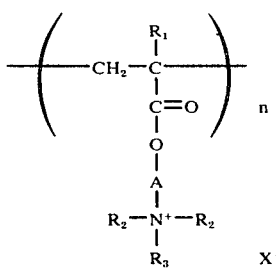

where "$R_1$" is H or $CH_3$; "$R_2$" is a lower alkyl group of 1 to 4 carbon atoms; "$R_3$" is H or a lower alkyl group of 1 to 4 carbon atoms; "$X^-$" is an anion selected from chlorine, bromine, and methyl sulfate; "A" is an alkyl group of 1 to 6 carbon atoms or an hydroxy alkyl group of 1 to 4 carbon atoms. The preferred monomers to make units of this structure are dimethylaminoethyl methacrylate, 2-hydroxy-3-methacryloxy propyl-trimethyl ammonium chloride, and, particularly, 2-methacryloxyethyl trimethyl ammonium methosulfate.

Still another useful class of cationic polymers are the acrylamido-alkyl quaternary ammonium structures represented by the formula

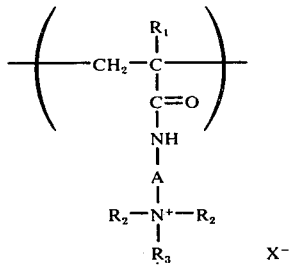

where "$R_1$," "$R_2$," "$R_3$," "$X^-$" and "A" are as defined above. A particularly useful group of acrylamidoalkyl quaternary ammonium monomers are represented by the polymeric formula

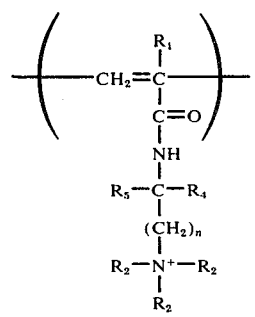

where "$R_1$," "$R_2$," and "$X^-$" are as defined above and "$R_4$" is H or a linear or branched alkyl group of up to 5 carbon atoms and "$R_5$" is phenyl or a linear or branched alkyl group of up to 5 carbon atoms and "$n$" is an integer from 1 to 3.

Our invention also contemplates the use of poly (alkylation quaternary ammonium) compounds usually referred to as ionenes. These types of polymers were first reported by C. S. Marvel in the early 1930's and have been well documented in the literature since then. For example, see Ritter U.S. Pat. No. 2,261,002; Searle U.S. Pat. No. 2,271,378; Kirby U.S. Pat. No. 2,375,853 and 2,388,614; Bock et al U.S. Pat. No. 2,454,547 and McCarty U.S. Pat. No. 3,206,462.

Our invention also contemplates the use of cationic condensation polymers. These polymers may be polyethylene imines or partially quaternized polyethylene imines. They may also be cationic condensation polymers prepared by condensing polyalkylene polyamines with alkyl dihalides such as ethylene dichloride and/or $\alpha\beta$ epoxyhalides such as epichlorohydrin. For example, see Wittcoff U.S. Pat. No. 2,483,749; Rogers et al U.S. Pat. No. 3,320,317; Walker et al U.S. Pat. No. 3,428,680; Voss U.S. pat. No. 3,408,440 and Schiegg U.S. Pat. No. 3,391,090.

For additional useful cationic polymers, see the article entitled "Cationic Quaternary Polyelectrolyte — A Literature Review" by M. F. Hoover presented at the 158th National ACS meeting, Sept. 9, 1969.

The polymers of our invention may be prepared by polymerizing the cationic monomer using any of the well known solution, emulsion or suspension techniques. Our invention is independent of the method of preparation so long as the resulting polymer is a water-soluble, high molecular weight, cationic polymer.

As mentioned above, some of the polymers of our invention are prepared by polymerizing unsaturated cationic quaternary ammonium monomers. It is also within the scope of our invention to use copolymers of two or more different cationic quaternary ammonium compounds. It is also within the scope of our invention to use polymers containing groups derived from monomers in addition to the cationic monomers.

Our invention contemplates the use of water-soluble cationic copolymers containing at least 2.5 percent cationic monomers such as desribed above and up to about 97.5 mole percent of other water-soluble cationic or nonionic comonomers and up to about 10 mole percent of water-insoluble comonomers. Examples of some of the useful water-soluble comonomers are acrylamide, methacrylamide, diacetone acrylamide and the N-lower alkyl substituted acrylamides and methacrylamides. Examples of some of the water-insoluble comonomers are vinyl acetate, acrylonitrile, vinyl chloride, styrene, and the lower alkyl esters of acrylic and methacrylic acid. Therefore, while the polymers of our invention consist essentially of cationic quaternary ammonium compounds, they may also contain up to about 97.5 mole percent of other water-soluble monomers (other than anionic) and up to about 10 mole precent of water-insoluble comonomers and still be within the scope of our invention. The important fact is that the polymers are water-soluble, high molecular weight and contain at least 2.5 percent cationic sites. The preferred polymers of our invention contain at least 5 percent quaternary ammonium groups.

The molecular weight of the cationic polymers may be as low as 1,000 or higher. We have found that generally the higher molecular weight polymers are somewhat better than very low molecular weight polymers. There is no reason to believe that there is a critical minimum molecular weight which must be achieved in order to show an improved flocculation process. However, for all practical purposes, a minimum molecular weight of about 10,000 is necessary for economic results.

The nonionic polymers we use should have molecular weights of at least 10,000. By far the most prefered polymers are unhydrolyzed polyacrylamide and polyethyleneoxide. By "unhydrolyzed" polyacrylamide, we mean to include any of the commercial products not intentionally hydrolyzed, in which up to 3 percent of the amide groups may have been incidentally converted to carboxylic acid during the production process.

The nonionic polymer is present in our compositions in concentrations providing a weight ratio of cationic polymer to nonionic polymer of from about 5 to 1 to about 20 to 1. Our compositions are added to the water in amounts sufficient to flocculate the suspended solids, preferably 0.1 ppm to 20 ppm of the premixed solution.

Our compositions are made and used in aqueous solution, preferably in concentrations of the mixture of polymers from about 5 percent solids to about 20 percent solids.

The preferred combination is a combination of the homopolymer of dimethyl diallyl ammonium chloride and unhydrolyzed polyacrylamide, in a weight ratio of from 10 to 1 to 20 to 1, in a 5 percent to 20 percent aqueous solution.

A series of jar tests were run to illustrate the performance of our polymer combinations in clarifying water. The tests were performed on samples of various river waters using a variable speed multiple stirrer and 1,000 milliliter beakers. Each test was performed by adding the polymer as an aqueous solution as quickly as possible to the raw water while stirring at 100 rpm. After the polymer was added, the treated water was agitated (by a standard stirrer) in the following sequence: 3 minutes at 100 rpm, 5 minutes at 50 rpm and 5 minutes at 20 rpm. Then the treated water was allowed to stand for 10 minutes. The supernatant was then tested for residual turbidity. The turbidity was tested on a Hach Turbidimeter and the results reported in Jackson Turbidity Units (J.T.U.). The results are shown in the following tables. The size of the floc that was formed was observed and rated on a scale of 1 to 24, with 1 being excellent size and 24 being very poor. Similarly the rate of settling was evaluated and rated on a scale of 1 to 24.

The notation C-F is a homopolymer of dimethyl diallyl ammonium chloride (DMDAAC), molecular weight about 200,000. C-F-B (10%) is a solution of the same DMDAAC homopolymer, 9.33 weight percent, mixed with 0.67 percent (based on the water) of a homopolymer of acrylamide, unhydrolyzed. MTMAMS means 2-methacryloxyethyl trimethyl ammonium methosulfate. PAM means polyacrylamide, unhydrolyzed. PEO means polyethyleneoxide. PEI means polyethylene imine. The notation Mg/l as applied to polymer solution means milligrams of polymer solution per liter of river water.

TABLE 1

JAR TESTS
Ohio River Water - Turbidity: 12 J.T.U.

| Polymer Solution | Mg/l | Alum Mg/l | NaOH Mg/l | Speed | Size | Settling | Observed Clarity |
|---|---|---|---|---|---|---|---|
| C-F (15%) | 1.0 | 20 | 12 | <1 | 9 | 9 | Haze |
| C-F-B (10%) | 1.0 | 20 | 12 | <1 | 9 | 9 | Haze |
| C-F (15%) | 0.5 | 10 | — | <1 | 12 | 12 | Slight Haze |
| C-F-B (10%) | 0.5 | 10 | — | <1 | 12 | 12 | Slight Haze |
| C-F (15%) | 1.0 | 10 | 6 | <1 | 12 | 15 | Slight Haze |
| C-F-B (10%) | 1.0 | 10 | 6 | <1 | 12 | 15 | Slight Haze |

TABLE 2

JAR TESTS
Beaver River Water - Turbidity: 18 J.T.U.

| Polymer Solution | Mg/l | Alum Mg/l | NaOH Mg/l | Speed | Size | Settling | Observed Clarity |
|---|---|---|---|---|---|---|---|
| C-F (15%) | 0.3 | 10 | — | <1 | 14 | 16 | Clear |
| C-F-B (10%) | 0.3 | 10 | — | <1 | 12 | 13 | Clear |
| C-F (15%) | 0.25 | 10 | 10 | <1 | 13 | 11 | Haze |
| C-F-B (10%) | 0.25 | 10 | 10 | <1 | 13 | 11 | Slight Haze |
| C-F (15%) | 0.50 | — | — | <1 | 10 | 11 | Clear |
| C-F-B (10%) | 0.50 | — | — | <1 | 9 | 10 | Clear |

TABLE 3

JAR TESTS
Mississippi River Water - Turbidity: 35 J.T.U.

| Polymer Solution | Mg/l | Alum Mg/l | Lime Mg/l | FeCl$_3$ Mg/l | Speed | Size | Settling | Observed Clarity | Measured Turbidity |
|---|---|---|---|---|---|---|---|---|---|
| C-F (15%) | 6.0 | — | — | — | <1 | 12 | Most down at 20 rpm | Clear | — |
| C-F-B (10%) | 6.0 | — | — | — | <1 | 12 | Most down at 20 rpm | Clear | — |
| C-F (15%) | 0.5 | 40 | — | — | <1 | 13 | 12 | Clear | — |
| C-F-B (10%) | 0.5 | 40 | — | — | <1 | 13 | 12 | Clear | — |
| C-F (15%) | 0.75 | — | 12.0 | 21 | <1 | 12 | 10 | Clear | 1.6 |
| C-F-B (10%) | 0.75 | — | 12.0 | 21 | <1 | 12 | 10 | Clear | 1.5 |
| C-F (15%) | 4.0 | — | — | — | <1 | 16 | 16 | Slight Haze | 4.7 |
| C-F-B (10%) | 4.0 | — | — | — | <1 | 15 | 15 | Slight Haze | 4.5 |

TABLE 4

JAR TESTS
Ohio River Water - Turbidity: 12 J.T.U.

| Polymer Solution | Mg/l | Alum Mg/l | Lime Mg/l | FeCl$_3$ Mg/l | Speed | Size | Settling | Measured Turbidity |
|---|---|---|---|---|---|---|---|---|
| MTMAMS/PAM | 0.2 | 15 | — | — | <1 | 12 | 12 | 11.5 |
| MTMAMS | 0.2 | 15 | — | — | <1 | 13 | 14 | 12.5 |
| MTMAMS/PEO | 0.2 | 15 | — | — | <1 | 13 | 12 | 11.0 |
| MTMAMS | 0.2 | 15 | — | — | <1 | 14 | 13 | 12.5 |
| PEI/PAM | 0.2 | 15 | — | — | <1 | 12 | 12 | 11.5 |
| PEI | 0.2 | 15 | — | — | <1 | 13 | 13 | 12.0 |
| PEI/PEO | 0.2 | 15 | — | — | <1 | 12 | 12 | 12.0 |
| PEI | 0.2 | 15 | — | — | <1 | 13 | 13 | 12.5 |
| DMDAAC/PEO | 0.2 | — | — | — | <1 | 13 | 12 | 12.0 |
| DMDAAC | 0.2 | — | — | — | <1 | 14 | 13 | 12.5 |

We claim:

1. Composition comprising a 5 to 20 percent aqueous solution of a mixture of dimethyl diallyl ammonium chloride homopolymer and polyacrylamide in a weight ratio of from 10 to 1 to 20 to 1.

2. A method of clarifying water containing suspended solids comprising adding to said water from about 0.1 ppm to about 20 ppm of a premixed solution of a mixture of a homopolymer of dimethyl diallyl ammonium chloride and unhydrolyzed polyacrylamide in a weight ratio of from 5 to 1 to 20 to 1.

* * * * *

UNITED STATES PATENT OFFICE
CERTIFICATE OF CORRECTION

PATENT NO. : 3,994,806
DATED : November 30, 1976
INVENTOR(S) : Emerson George Rausch and Ramon Anthony Muia It is certified that error appears in the above-identified patent and that said Letters Patent are hereby corrected as shown below:

Column 3, line 46, "2-hydroxy-3-methacryloxy" should read -- 2-hydroxy-3-methacrylyloxy --.

Column 5, line 14, after "1,000" insert -- or as high as 1,000,000 --.

Signed and Sealed this

First Day of March 1977

[SEAL]

Attest:

RUTH C. MASON
Attesting Officer

C. MARSHALL DANN
Commissioner of Patents and Trademarks